United States Patent [19]

Takado et al.

[11] Patent Number: 5,486,365
[45] Date of Patent: Jan. 23, 1996

[54] CALCIUM HYDROGEN PHOSPHATE, A METHOD FOR PREPARING IT, AND AN EXCIPIENT UTILIZING IT

[75] Inventors: Kanemasa Takado, Takaoka; Tatsuo Murakami, Kamiichi, both of Japan

[73] Assignee: Fuji Chemical Industry Co., Ltd., Japan

[21] Appl. No.: 272,043

[22] Filed: Jul. 8, 1994

[30] Foreign Application Priority Data

Sep. 17, 1993 [JP] Japan .................................. 5-254741

[51] Int. Cl.$^6$ ............................ A61K 33/42; C01B 25/32
[52] U.S. Cl. ......................... 424/602; 423/265; 423/308; 423/309
[58] Field of Search ..................................... 423/308, 309, 423/265; 424/57, 602

[56] References Cited

U.S. PATENT DOCUMENTS 2,697,024 12/1954 Moss et al. .............................. 423/308
4,481,175 11/1984 Iino et al. ................................ 423/309
4,721,615 1/1988 Griffith et al. .......................... 423/309

FOREIGN PATENT DOCUMENTS 51-31238 9/1976 Japan .

OTHER PUBLICATIONS

Kyowa Chemical Industry Co. Catalog entitled Ricamitt U–500 & Anhydrous Calcium Hydrogen Phosphate GS, published 1971.
Pharmacopoeia of Japan (12 Rev 1991) pp. D–1034 to D–1038.

*Primary Examiner*—Wayne Langel
*Attorney, Agent, or Firm*—Larson & Taylor

[57] ABSTRACT

The object of the present invention is to prepare a calcium hydrogen phosphate that has excellent binding properties, a large oil adsorption capacity and a specific surface area, and is therefore suitable as an excipient.

A scale-like calcium hydrogen phosphate is prepared by reacting phosphoric acid with an alkaline calcium compound such as quick lime, in the presence of a multivalent organic acid with coordinating ability, such as citric acid, to obtain a columnar calcium hydrogen phosphate, and then hydrothermally treating the obtained columnar calcium hydrogen phosphate at a temperature of 60° C. or higher.

8 Claims, 3 Drawing Sheets

CALCIUM HYDROGEN PHOSPHATE, A METHOD FOR PREPARING IT, AND AN EXCIPIENT UTILIZING IT

BACKGROUND OF THE INVENTION

1. Field of the Invention

The present invention relates to a calcium hydrogen phosphate for use in such items as medicines, cosmetics, and foods, as well as a method for preparing the calcium hydrogen phosphate and an excipient utilizing it.

2. Prior Art

Calcium hydrogen phosphate is used in such items as pharmaceuticals and foods to reinforce calcium and phosphoric add components and as an anti-caking agent.

Since calcium hydrogen phosphate is non-hygroscopic, inert, non-reactive with medicines, and does not discolor formulations, attempts have been made to utilize it as an excipient for such items as medicines, cosmetics, and foods. However, since calcium hydrogen phosphate takes the form of sheet-like crystalline granules of 10 μm or more and thereofore features inferior binding properties, unsuitabe as an excipient. In order to avoid this drawback, calcium hydrogen phosphate is conventionally pulverized into fine granules or combined with a binding agent such as sodium polyacrylate to give it molding properties.

DETAILED DESCRIPTION OF THE PREFERRED EMBODIMENTS

First Embodiment

Figure 1:
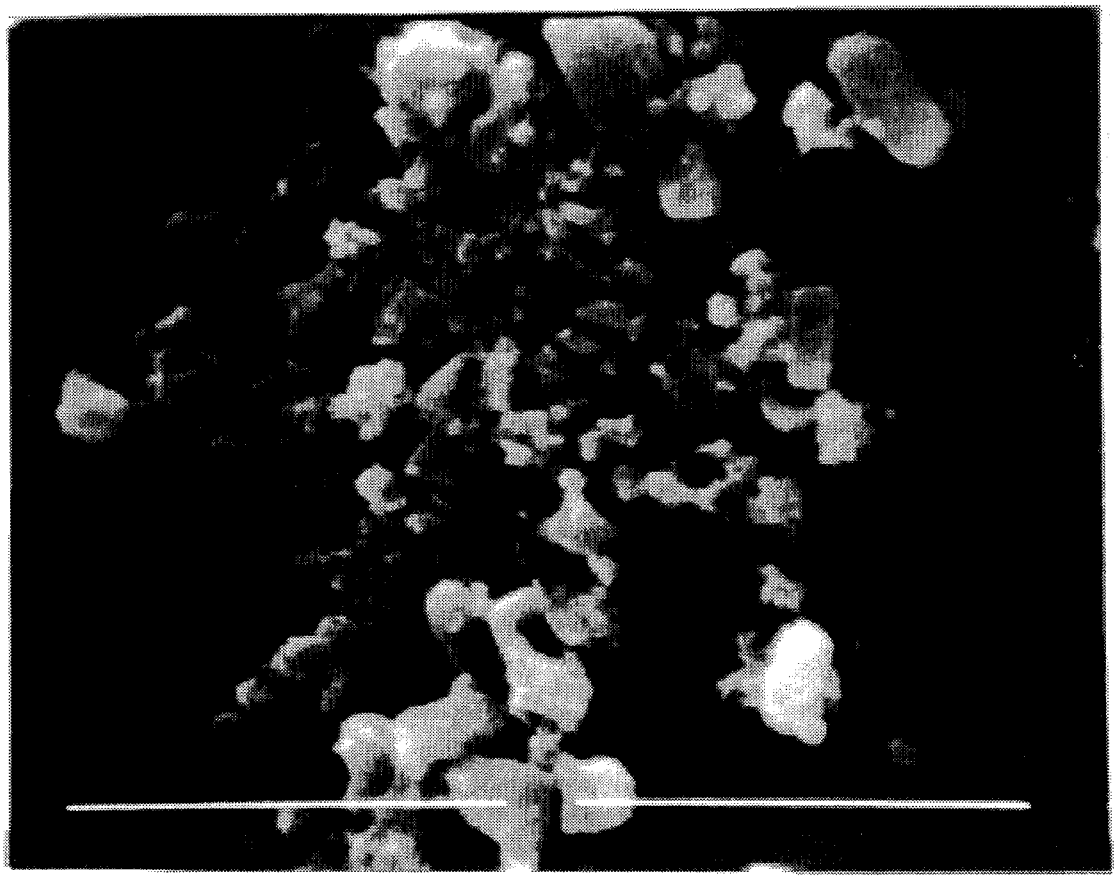
FIG. 1 is a scanning electron micrograph of Example 1.

None of the methods conventionally employed have been sufficiently effective, thus far failing to give clacium hydrogen phosphate satisfactory properties as an excipient The present invention has been made taking the above circumstances into consideration, and the object of the present invention is to provide a calcium hydrogen phosphate with excellent binding properties that can also be easily used as an excipient in such items as medicines and foods, as well as a method for preparing such a calcium hydrogen phosphate. Another object of the present invention is to provide an excipient utilizing a calcium hydrogen phosphate.

In attempt to achieve the above objects, the present inventors have made various investigations based on the new technology claimed in Japanese Patent Application No. 5-98473. The present inventors have succeeded in obtaining a scale-like calcium hydrogen phosphate that is ideal as an excipient by hydrothermally treating the columnar calcium hydrogen phosphate produced by the joint use of a multivalent organic acid described in the above-mentioned patent application. The calcium hydrogen phosphate obtained has small crystalline particles, a large apparent specific volume, a large specific area, and features excellent off absorption ability.

Furthermore, the calcium hydrogen phosphate with the above properties can easily be formed into spherical particles through granulation by spray drying. This spherical product is not inferior to the scale-like product in terms of its molding properties, yet it features good in flow ability and workability. Therefore, the present inventors believe that this spherical product can be utilized as an ideal excipient and have completed the present invention.

The calcium hydrogen phosphate of the present invention has a specific surface area of 20 $m^2/g$ to 60 $m^2/g$, a apparent bulk specific volume of 5 ml/g or more, an off absorption rate of 1.5 ml/g or more, a primary particle size (as measured by an laser analyzer) of 0.1μ to 5μ, and an average particle size (as measured by scanning electron microscope) of 2μ to 10μ among secondary particles that are aggregates of the primary particles. This scale-like calcium hydrogen phosphate is represented by the following general formula:

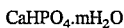

$$CaHPO_4 \cdot mH_2O$$

wherein m satisfies the expression $0 \leq m \leq 0.5$.

Conventionaly, commercial calcium hydrogen phosphates come in sheet form and have a specific surface area of 1 $m^2/g$ or less, a static apparent specific volume of approximately 2 ml/g, an oil absorption rate of approximately 0.5 ml/g, and a primary particle size (as measured by a scanning electron microscope) of 10 μm or more. In contrast, the calcium hydrogen phosphate of the present invention comes in the form of a scale-like powder with a greater specific surface area, is bulkier, and features greater oil absorption. As clearly demonstrated in the examples to be discussed later, its molding properties have been improved, and it maintains all the advantages that calcium hydrogen phosphate has naturally, such as its non-reactivity with medicines and the fact that it discolors not color formulations. With respect to the moisture content of this calcium hydrogen phosphate, it can be made into a hydrate with 0.5 $H_2O$ to an anhydride, depending on drying conditions. For example, it can easily be made into an anhydride by heating it to 300° C. to dry it.

The method of the present invention for preparing such a calcium hydrogen phosphate is characterized by reacting either phosphoric add with an alkaline calcium compound or an alkali metal phosphate with a calcium compound in an aqueous medium in the presence of a multivalent organic acid with the coordinating ability to obtain a columnar calcium hydrogen phosphate, and then subjecting the obtained columnar calcium hydrogen phosphate by hydrothermal treatment at a temperature of 60° C. or higher.

The alkaline calcium compound used in the present invention is one that neutralizes phosphoric add. Examples of these compounds include quick lime (CaO), slaked lime [Ca(OH)$_2$], and calcium carbonate (CaCO$_3$). One or more of these compounds can be used in the present invention. These calcium compounds are used in the reaction after calculation of the theoretical amount necessary for neutralization.

The alkali metal phosphate used in the present invention is a compound that neutralizes a water-soluble calcium compound such as calcium chloride. Examples of these compounds include sodium hydrogen phosphate and sodium phosphate, and one or more of these compounds can be used in the present invention.

The multivalent organic acid used in the present invention is an organic acid that acts as a crystallizing agent in the reaction between a calcium compound and a phosphoric acid, as described above. In a reaction in the presence of this organic add, calcium hydrogen phosphate is quickly precipitated in the form of crystals. It is preferable that the organic acid be a multivalent organic acid with coordinating ability. Examples of these compounds include citric acid, tartaric acid, ethylenediaminetetraacetic add (EDTA), malic acid, and succinic acid. One or more of these acids can be used in the present invention. The extent to which these acids are used is determined upon consideration of such factors as the size of the crystalline granules to be produced. Preferably, such acids are used in amounts between 0.5 mol % 10 mol % in relation to the amount of calcium hydrogen phosphate to be produced. If the amount of such acids is less than 0.5 mol %, the add cannot have the necessary crystallizing effect, so large calcium hydrogen phosphate crystals are produced. If the amount of such acids exceeds 10 mol %, it has no influence on crystal size. Such add can be added before the reaction between phosphoric acid and a calcium compound; it can even be added during the reaction. The reaction can be conducted at a temperature of 50° C. or lower. In order to promote the reaction, agitation, ultrasonic vibration, or a similar action can be performed on the reaction system. Furthermore, in terms of such factors as reaction yield, it is preferable that the reaction is conducted at a pH level between 4 and 5.

The calcium hydrogen phosphate that is precipitated under the above reaction conditions is expressed by the following formula:

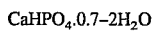

$CaHPO_4 \cdot 0.7\text{-}2H_2O$ and takes the form of a columnar crystal.

Furthermore, by hydrothermally heating the slurry containing the columnar hydrate at a temperature of 60° C. or higher, (preferably 90° C. or higher), the columnar product becomes a scale-like product represented by the formula $CaHPO_4 \cdot mH_2O$ (wherein m satisfies the expression $0 \leq m \leq 0.5$) With respect to the temperature of this hydrothermal treatment, dehydration takes a long time at 60° C. to 90° C., whereas relatively rapid dehydration occurs at a temperature of 90° C. or higher. Based on this data, the temperature may be properly set after such factors as the time, temperature, and manufacturing facilities involved are taken into consideration.

Since the scale-like calcium hydrogen phosphate has entirely different physical properties than conventional calcium hydrogen phosphate, it can be used as an excipient independently or in conjunction with other excipients. In addition, since it features excellent oil absorption properties and a specific surface area, it can be used as an anti-caking agent for such items as powdered milk, table salt, and various seasonings. Since it does not have an unpleasant taste, does not irritate the skin, and takes form of fine particles, it is also suitable for use in various food items and cosmetics. Furthermore, due to the above properties it can be used in toiletries such as detergent and soap as an anti-slime agent. For such usages, since it is neutral, this calcium hydrogen phosphate is suitable to be combined with a coating material containing an alkaline or acidic unstable substance.

On the other hand, the primary characteristic of the scale-like calcium hydrogen phosphate of the above physical properties is the fact that it can be easily formed into spherical shapes through granulation by spray drying. Even if subjected to spray drying, conventional scale-like or columnar calcium hydrogen phosphates simply produce dried primary particle materials, which are different from the spherical shapes peculiar to spray-dried materials. Although it is to some extent possible to prepare spray-dried particles from a conventional calcium hydrogen phosphate pulverized into fine powder by a binder or other such device, the resultant spherical objects will inevitably be distorted in terms of their shape.

The calcium hydrogen phosphate of the present invention can be formed into spherical shapes without the use of a binder or other such device. Its physical properties are therefore advantageous for its use as an excipient as well as when it is formed into spray-dried particles. In other words, it is presumed that the fact that the calcium hydrogen phosphate of the present invention takes the form of fine particles with a large specific surface area, a large apparent specific volume, and a high oil absorption rate should make the scale-like calcium hydrogen phosphate tacky and cohesive, thereby forming it into spherical shapes.

As shown in the examples, this spherical granule is comparable to scale-like calcium hydrogen phosphate in terms of its molding properties. In addition, the spherical material has the advantages of good fluidity, which is a characteristic of spray-dried particles, as well as good workability. Therefore, it is an ideal excipient.

Furthermore, this spherical granule obtained by spray drying can be made even more functional through the use of a suspension containing such items as various medicines or binding agents during the spray-drying granulation process. For example, if a relatively easily discolored medicine such as Vitamin C is spray-dryed along with the scale-like calcium hydrogen phosphate to form a spherical particle, the medicine can be made more stable in the formulation. And if the spherical material contains a binding agent or a similar substance, its strength can be increased. On the other hand, if a spherical particle has a high moisture content, it can be made to feature good disintegration properties. Thus, the strength of the spherical material can be varied depending on its usage. Examples of the above medicines include acids such as ascorbic acid and aspirin that are unstable at alkaline pH levels, quaternary ammonium salts, and amines such as nicotinamide that are unstable at acidic pH levels.

Cellulose derivatives such as carboxymethylcellulose sodium, methylcellulose, and hydroxyethylcellulose; alginates of an alkali metal such as caraginane and sodium alginate; gum agents such as xanthane gum, tragacanth gum, KARAYA gum, and gum arabic; synthetic binding agents such as polyvinylalcohol, sodium polyacrylate, and carboxyvinyl polymers; and inorganic binding agents such as magnesium aluminate metasilicate and synthetic aluminum silicate, may be used as binding agents.

Spray-drying may be conducted according to any of the conventional methods. Therefore, such methods as the nozzle atomization method or the centrifugal atomization one may be selected depending on such factors as the particle size of the spherical particle to be produced. The particle size can be set in a range from approximately 10 μm to 500 μm. Although the temperature conditions, such as inlet and outlet temperature, vary in spray-drying depending on the kind and quantity of solvent to be used, it is preferable, as in the case of a suspension of the scale-like calcium hydrogen phosphate as it is being spray-dried, that the inlet temperature be 200° C. to 400° C. and the outlet temperature be 100° C. to 200° C. In preparing the above suspension, a suspension or solution of the previously mentioned medicines and binding agents, organic solvents such as methyl alcohol, ethyl alcohol, ethylene glycol, or mixtures thereof, as well as water, are suitable for use.

Second Embodiment

While two liters of water were being agitated, quick lime (CaO, purity 96%) was added and the mixture was agitated for 30 minutes to produce lime milk. This lime milk was filtered through a 100 mesh filter to remove any coarse granules. The concentration of this lime milk was 100 g/l of CaO. Citric acid (purity 99.9%), which is equivalent to 5 mol % of the yield of calcium hydrogen phosphate, was then dissolved in the amount of 15.8 g into two liters of water, and while being agitated at room temperature to a temperature of 40° C., 294 g of a 50% aqueous phosphoric add solution and 1.1 liters of the lime milk prepared as described above were simultaneously added to the citric add solution for 30 minutes. Then the agitation was then continued for a further 30 minutes to complete the reaction.

The resultant reaction solution was then heated to 95° C., agitated for 30 minutes, rinted, and dried to obtain a calcium hydrogen phosphate. This product was designated Example 1. FIG. 1 shows a scanning electron micrograph of Example 1. The white bar at the bottom of the figure indicates 10 μm.

By varying the amount of citric acid as well as the kind of calcium compound, several calcium hydrogen phosphates were then prepared in a similar manner to Example 1. The calcium hydrogen phosphates obtained were designated Examples 2, 3, 4, and 5, respectively. Table 1 shows the kinds of organic acids and calcium compound used as well as the amounts added in Examples 1 to 5.

TABLE 1

|  | Organic acid, amount added |  | Calcium compound |
|---|---|---|---|
| Example 1 | Citric acid | 5 mol % | Quick lime |
| Example 2 | Citric acid | 0.5 mol % | Quick lime |
| Example 3 | Citric acid | 10 mol % | Quick lime |
| Example 4 | Citric acid | 5 mol % | Slaked hine |
| Example 5 | Citric acid | 5 mol % | Calcium chloride Sodium dihydrogen phosphate |

Figure 2:
FIG. 2 is a scanning electron micrograph of Comparative Example 1.
Figure 3:
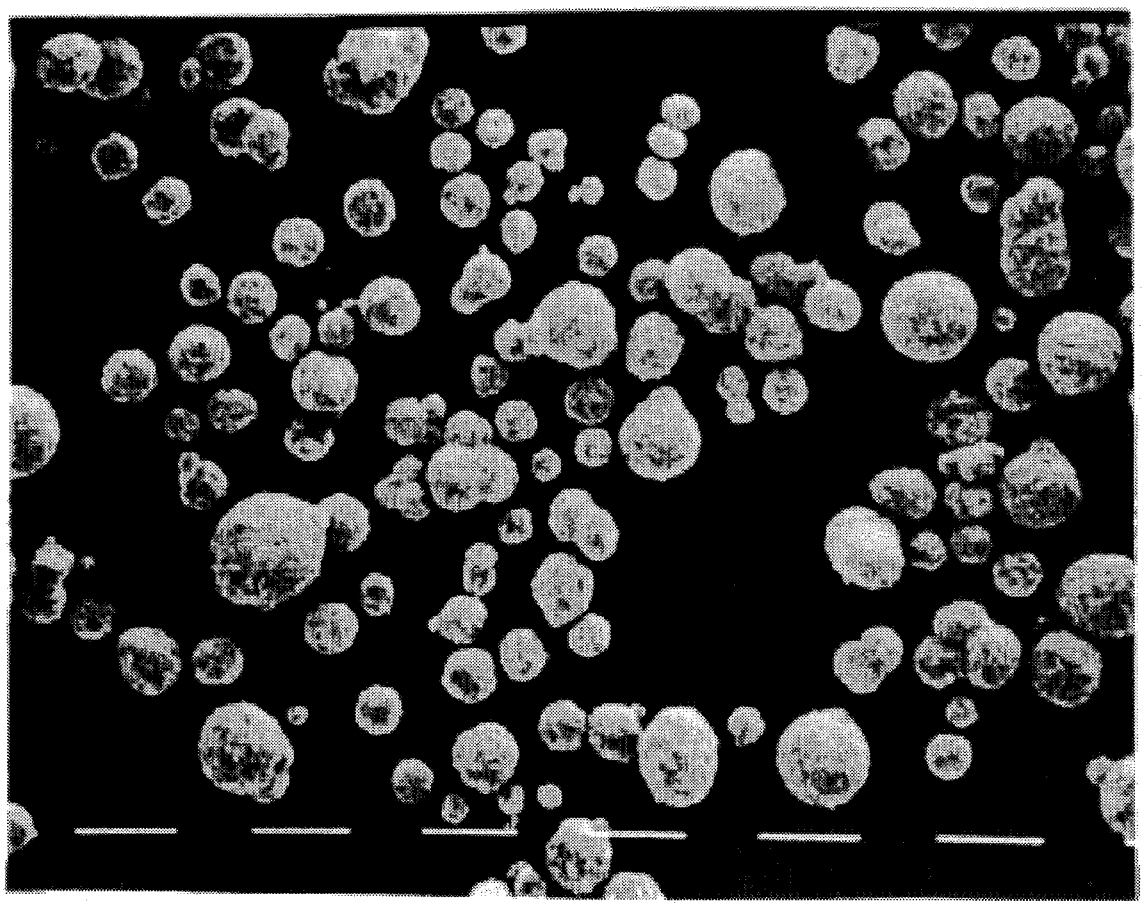
FIG. 3 is a scanning electron micrograph of Example 6.

Table 2 shows the physical properties and moisture contents of Examples 1 to 5. Comparative Example 1 appearing in this Table refers to a calcium hydrogen phosphate prepared in fundamentally the same manner as Example 1, except that no multivalent organic acid was used. FIG. 2 shows a scanning electron micrograph of Comparative Example 1. Comparative Example 2 appearing in this Table is a commercial calcium hydrogen phosphate anhydride manufactured by Kyowa Chemical Co.

slurry. This slurry was then spray-dried using a centrifuge-type atomizer at an inlet temperature of 300° C. and an outlet temperature of 200° C. A spherical calcium hydrogen phosphate was obtained, which was designated Example 6. FIG. 3 shows a scanning electron micrograph of Example 6. The white bar appearing in this FIG. indicates 100 μm. Furthermore, the calcium hydrogen phosphates of Examples 2 to 5 were treated in a similar manner, and the resultant products were designated Examples 7 to 10. Although the calcium hydrogen phosphate obtained in Comparative Example 1 was also treated similarly and spray-dried as in Example 6, the spray-dried granule did not become spherical in shape. This product was designated Comparative Example 3.

The scale-like calcium hydrogen phosphate produced in Example 1 was suspended in water to make a 20 wt % slurry. Ascorbic acid in an amount equivalent to 10% of the calcium hydrogen phosphate was dissolved nto the slurry, and the slurry was then spray-dried using a centrifuge-type atomizer at an inlet temperature of 300° C. and an outlet temperature of 100° C. A spherical calcium hydrogen phosphate was obtained and designated Example 11.

The scale-like calcium hydrogen phosphate produced in Example 1 was then suspended in water to make a 20 wt % slurry. Synthetic aluminum silicate and benzalkonium chloride were added to this slurry in an amount equivalent to 10% and 0.2%, respectively, of the calcium hydrogen phosphate. The resultant slurry was treated in a similar manner to that in Example 1. A spherical calcium hydrogen phosphate was obtained and designated Example 12.

A 400 mg each of the products obtained in Examples 1 to 10 and comparative Examples 1 to 3 was pressed with a mortar (12 mm in diameter) and poundered which were equipped in Brinell hardness test machine to make tablets by the static compression. The hardness of the resultant tablets were measured with the Monsant hardness meter. The results are shown in Table 3.

TABLE 2

|  | Specific surface area m$^2$g | Apparent specific volume ml/g | Oil absorption ml/g | Primary particle μ | Average secondary particle size μ | Moisture content % |
|---|---|---|---|---|---|---|
| Example 1 | 40.6 | 6.4 | 1.5 | 0.5–2 | 4.5 | 0.90 |
| Example 2 | 20.5 | 5.8 | 1.0 | 1–3 | 5.0 | 0.3 |
| Example 3 | 55.6 | 6.9 | 1.6 | 0.2–1 | 2.7 | 0.62 |
| Example 4 | 42.1 | 6.5 | 1.4 | 0.2–2 | 4.2 | 0.71 |
| Example 5 | 39.6 | 6.0 | 1.4 | 0.5–2 | 4.8 | 0.59 |
| Comparative Example 1 | 3.65 | 1.7 | 0.80 | 10–30 | 30.2 | 0.04 |
| Comparative Example 2 | 0.92 | 1.6 | 0.62 | 11–30 | 36.2 | 0.02 |

In Table 2, specific surface area is measured by the BET method, and the size of primary particles as well as the avenge size of secondary particles were measured by a laser distribution analyser. Apparent specific volume was measured by first inserting a glass tube into a 100 ml measuring cylinder. A sample was then introduced into the glass tube using a funnel to bring the sample volume to 90 ml to 100 ml. The glass tube was then withdrawn gently. The volume of the sample was determined after its surface was levelled (Vml). The V/W ratio was then calculated (where W is sample weight (W). Oil absorption was measured according to JIS KS101, using boiled linseed oil as the oil agent.

The scale-like calcium hydrogen phosphate produced in Example 1 was then suspended in water to make a 20 wt %

TABLE 3

|  | Load kg/cm$^2$ | | | |
|---|---|---|---|---|
|  | 500 | 1000 | 1500 | 2000 |
| Example 1 | 10.9 | 14.8 | 20.5 | 24.2 |
| Example 2 | 6.1 | 7.7 | 11.5 | 13.9 |
| Example 3 | 14.0 | 17.6 | 24.3 | 27.6 |
| Example 4 | 13.1 | 15.2 | 21.8 | 25.0 |
| Example 5 | 12.2 | 14.5 | 20.5 | 24.4 |
| Emample 6 | 14.0 | 17.0 | 23.7 | 26.8 |
| Example 7 | 7.0 | 8.9 | 12.1 | 15.0 |
| Example 8 | 14.2 | 18.0 | 23.7 | 26.8 |
| Example 9 | 13.5 | 16.8 | 22.2 | 26.5 |

TABLE 3-continued

|  | Load kg/cm² | | | |
|---|---|---|---|---|
|  | 500 | 1000 | 1500 | 2000 |
| Example 10 | 12.8 | 15.0 | 21.8 | 25.0 |
| Comparative Example 1 | 0.2 | 0.9 | 1.9 | 2.6 |
| Comparative Example 2 | 0.8 | 1.4 | 1.9 | 2.8 |
| Comparative Example 3 | 0.3 | 1.1 | 2.0 | 2.8 |

Table 4 shows the results of the discoloring tendency inspection of the tablets that were prepared from the spherical calcium hydrogen phosphate of Example 6 and crystal cellulose, according to the prescription described in the same Table, in a similar manner to that mentioned above. In this inspection, the tablets were kept at a temperature of 40° C. and 75% relative humidity, at temperature of 60° C., and at room temperature. The degree of white coloration at the beginning of the inspection and three weeks after it was begun are shown in Hunter values (CWH value). "Ini" indicates the beginning of the inspection and "3W" indicates three weeks after it was begun.

TABLE 4

|  |  | (1) | | (2) | | (3) | | (4) | |
|---|---|---|---|---|---|---|---|---|---|
| Prescription | CaHPO$_4$ | 74% | | | | 74% | | 74% | |
|  | crystal cellulose | | | 74% | | | | | |
|  | ECG505 | 5% | | 5% | | 5% | | 5% | |
|  | ascorbic acid | 20% | | 20% | | | | | |
|  | aspirin | | | | | 20% | | 20% | |
|  | magnesium stearate | 1% | | 1% | | 1% | | 1% | |
|  |  | (Ini) | (3W) | (Ini) | (3W) | (Ini) | (3W) | (Ini) | (3W) |
| 40° C. - 75% Degree of white coloration (Hanter whiteness value) |  | 95.05 | 87.95 | 94.57 | 87.31 | 96.75 | 96.83 | 95.98 | 93.88 |
| 60° C. Degree of white coloration (Hanter whiteness value) |  | 95.05 | 89.86 | 94.57 | 71.15 | 96.75 | 95.90 | 95.88 | 90.40 |
| Room temperature Degree of white coloration (Hanter whiteness value) |  | 95.05 | 94.70 | 94.57 | 93.84 | 96.75 | 96.35 | 95.88 | 94.98 |

The calcium hydrogen phosphate of the present invention features excellent binding properties and is suitable for use as an excipient for such items as medicines. Furthermore, since the calcium hydrogen phosphate has good oil absorption qualities and a large surface area, it can also be used in food and cosmetics. According to the preparation method of the present invention, this calcium hydrogen phosphate can be easily prepared.

We claim:

1. A scale-like calcium hydrogen phosphate with a specific surface area of 20 m²/g to 60 m²/g, an apparent specific volume of 5 ml/g or more, an oil absorption rate of 1.5 ml/g or more, a primary particle size of 0.1µ to 5µ, and an average particle size of 2µ to 10µ among secondary particles that are aggregates of the primary particles, the scale-like calcium hydrogen phosphate being represented by the following general formula:

$$CaHPO_4 \cdot mH_2O$$

wherein m satisfies the relationship $0 \leq m \leq 0.5$.

2. A spherical calcium hydrogen phosphate obtained by granulating the calcium hydrogen phosphate of claim 1 by spray drying.

3. A spherical calcium hydrogen phosphate obtained by adding a medicinal ingredient and/or a binding agent to the calcium hydrogen phosphate of claim 1 and then granulating the resultant calcium hydrogen phosphate by spray drying.

4. An excipient with the calcium hydrogen phosphate of claim 1 as a major component.

5. An excipient with the calcium hydrogen phosphate of claim 2 as a major component.

6. A method for preparing a scale-like calcium hydrogen phosphate having a calcium to phosphate ratio of exactly 1.0 by reacting either phosphoric acid with an alkaline calcium compound or an alkali metal phosphate with a calcium compound in an aqueous medium in the presence of a multivalent organic acid selected from the group consisting of citric acid, tartaric acid, ethylenediaminetetraacetic acid (EDTA), malic acid and succinic acid with the coordinating ability in order to obtain a columnar calcium hydrogen phosphate, and then subjecting the obtained columnar calcium hydrogen phosphate to hydrothermal treatment at a temperature of 60° C. or higher to obtain said scale-like calcium hydrogen phosphate.

7. A method for preparing a scale-like calcium hydrogen phosphate according to claim 6, wherein said scale-like calcium hydrogen phosphate is granulated by spray drying after said hydrothermal treatment.

8. A method for preparing a scale-like calcium hydrogen phosphate according to claim 6, wherein a medicinal ingredient and/or a binding agent is added to said scale-like calcium hydrogen phosphate after said hydrothermal treatment, and then the resultant calcium hydrogen phosphate is granulated by spray drying.

* * * * *